J. H. LAWSON.
Wagon-Brake.

No. 214,407. Patented April 15, 1879.

WITNESSES

INVENTOR
James H. Lawson.
By Gilmore, Smith & Co.
ATTORNEYS.

UNITED STATES PATENT OFFICE.

JAMES H. LAWSON, OF TALLADEGA, ALABAMA.

IMPROVEMENT IN WAGON-BRAKES.

Specification forming part of Letters Patent No. 214,407, dated April 15, 1879; application filed March 1, 1879.

*To all whom it may concern:*

Be it known that I, JAMES H. LAWSON, of Talladega, in the county of Talladega and State of Alabama, have invented certain new and useful Improvements in Wagon-Brakes; and I do hereby declare that the following is a full, clear, and exact description of the construction and operation of the same, reference being had to the annexed drawings, making a part of this specification, and to the letters and figures of reference marked thereon.

Figure 1:
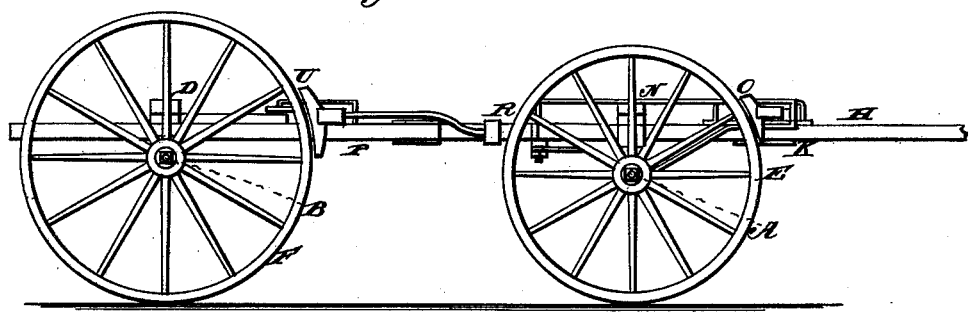
Figure 2:
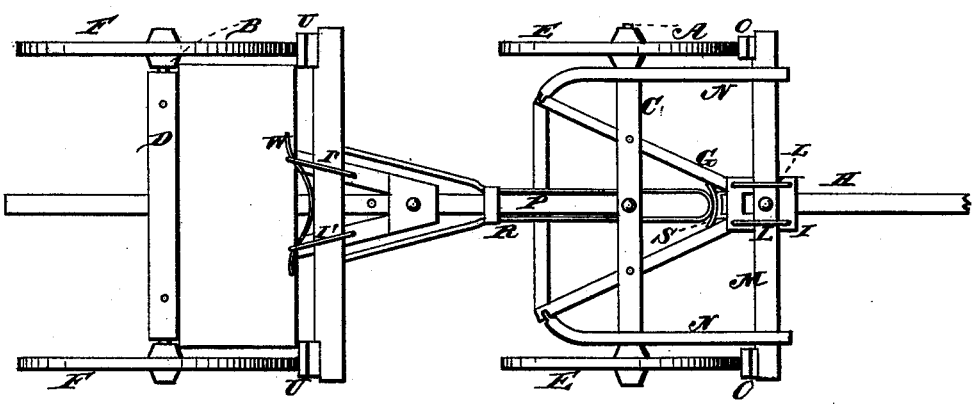

Figure 1 of the drawings is a representation of a side elevation of my wagon-brake, and Fig. 2 is a plan view of the same.

This invention relates to an improved brake for vehicles, which will be automatically operated by the weight of the vehicle when traveling down an incline; and it consists in the improvements in the construction of the same, hereinafter fully described, and particularly pointed out in the claim.

The letters A and B represent the front and rear axles of the vehicle, respectively, and C and D the front and rear bolsters. The letters E E represent the front, and F F the rear, wheels of the vehicle. The letter G represents the front hounds of the vehicle, between the forward ends of which is loosely seated the tongue H, the same being held in its seat by the metallic frame I and cross-straps K. Said tongue is capable of a slight reciprocating movement in a longitudinal direction in its seat, the motion being limited by means of guides L, secured to the frame I, and the double-tree M, attached to said tongue, said double-tree being confined by said guides so as to move with the tongue upon the frame I. From the rear ends of the hounds extend forwardly metallic guides N, which embrace the ends of the double-tree and keep the same in proper position. The double-tree extends transversely across the front of the vehicle, and is provided at its ends with brake-shoes O, which bear upon the front wheels of the vehicle when the brake is in operation, as more fully hereinafter explained.

The letter P represents the reach of the vehicle, which is pivoted at its forward end between the front axle and its bolster. Said reach passes backwardly between the rear hounds of the vehicle in the usual manner. The letter R represents a metallic frame, the forward portion of which embraces the reach, and is adapted to reciprocate back and forth thereon. The forward extremity of said frame is rounded and bears against a segmental seat, S, on the rear of the tongue, and to the rear of said frame a transverse brake-bar is secured by means of guides I' to the rear hounds. Said brake-bar is provided at its ends with brake-shoes U, which are adapted to bear against the rear wheels when the brake mechanism is in operation. At the rear of this brake-bar is secured a flat spring, W, which keeps the brake mechanism in a normal position.

The operation of my invention is as follows: When the vehicle is traveling down an incline the weight of the vehicle is thrown forward upon the tongue, which falls backward in its seat, setting the brakes against the wheels.

I claim—

The front hounds of a vehicle having guides embracing a double-tree provided with brake-shoes and pivoted to the tongue, loosely seated between the forward ends of the hounds, and provided with a curved bearing at its rear end, in combination with a sliding frame embracing the reach and having a rounded forward end, a cross-bar provided with brake-shoes and working in loops on the rear hounds of the vehicle, and a spring for holding the cross-bar out of operation, except when the weight of the vehicle is thrown upon the tongue, as and for the purpose set forth.

In testimony that I claim the above I have hereunto subscribed my name in the presence of two witnesses.

JAMES HENRY LAWSON.

Witnesses:
 ISHAM J. HALL,
 WM. H. COKER.